United States Patent
Peng et al.

(10) Patent No.: US 12,287,352 B2
(45) Date of Patent: Apr. 29, 2025

(54) ULTRA-LOW POWER READOUT CIRCUIT WITH HIGH-VOLTAGE BIAS GENERATION FOR MEMS ACCELEROMETER

(71) Applicant: THE REGENTS OF THE UNIVERSITY OF MICHIGAN, Ann Arbor, MI (US)

(72) Inventors: Yimai Peng, Ann Arbor, MI (US); David Blaauw, Ann Arbor, MI (US); Dennis Sylvester, Ann Arbor, MI (US); David Kyojin Choo, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 373 days.

(21) Appl. No.: 17/983,463

(22) Filed: Nov. 9, 2022

(65) Prior Publication Data
US 2023/0146711 A1 May 11, 2023

Related U.S. Application Data

(60) Provisional application No. 63/263,778, filed on Nov. 9, 2021.

(51) Int. Cl.
*G01P 15/125* (2006.01)
*G01P 15/08* (2006.01)

(52) U.S. Cl.
CPC .... *G01P 15/125* (2013.01); *G01P 2015/0862* (2013.01)

(58) Field of Classification Search
CPC .................. G01P 15/125; G01P 2015/0862

USPC ........................................ 73/514.32; 327/310
See application file for complete search history.

(56) References Cited

U.S. PATENT DOCUMENTS

| | | | | |
|---|---|---|---|---|
| 7,817,075 B2 * | 10/2010 | Lu | ......................... | H03M 3/454 |
| | | | | 341/172 |
| 8,742,964 B2 * | 6/2014 | Kleks | ..................... | H03M 3/494 |
| | | | | 333/197 |
| 9,689,889 B1 * | 6/2017 | Casiraghi | .............. | G01P 15/125 |
| 11,472,696 B1 * | 10/2022 | Li | ........................... | G01V 1/164 |
| 2008/0079444 A1 * | 4/2008 | Denison | ................... | G01D 5/24 |
| | | | | 324/679 |
| 2009/0322353 A1 * | 12/2009 | Ungaretti | .............. | G01L 9/0073 |
| | | | | 324/686 |
| 2012/0217171 A1 * | 8/2012 | Wurzinger | ............... | H04R 1/04 |
| | | | | 204/406 |
| 2013/0265070 A1 * | 10/2013 | Kleks | ................. | G01R 27/2605 |
| | | | | 324/750.3 |

* cited by examiner

*Primary Examiner* — William Hernandez
(74) *Attorney, Agent, or Firm* — Harness, Dickey & Pierce, P.L.C.

(57) ABSTRACT

A motion sensing system uses high-voltage biasing to achieve high resolution with ultra-low power. The motion sensing system consists of a motion sensor, a readout circuit, and a high-voltage bias circuit to generate the optimized bias voltage for the motion sensor. By using the high-voltage bias, the signal from the motion sensor is raised above the readout circuit's noise floor, eliminating the power-hungry amplifier and signal-chopping used in conventional motion sensing systems. The bias circuit, while producing the programmable bias voltages for the motion sensor, also compensates for the process mismatch raised by the high voltage biases.

19 Claims, 8 Drawing Sheets

ULTRA-LOW POWER READOUT CIRCUIT WITH HIGH-VOLTAGE BIAS GENERATION FOR MEMS ACCELEROMETER

CROSS-REFERENCE TO RELATED APPLICATION

This application claims the benefit of U.S. Provisional Application No. 63/263,778, filed on Nov. 9, 2021. The entire disclosure of the above application is incorporated herein by reference.

FIELD

The present disclosure relates to an ultra-low power readout circuit with high-voltage bias generation and mismatch compensation for MEMS accelerometers.

BACKGROUND

MEMS (microelectromechanical systems) accelerometers with on-chip CMOS readout circuits (ROIC) are becoming increasingly attractive for IoT monitoring of objects or gestures due to their miniaturized volume and low noise operation. Consisting of a micro-mechanical spring-mass system, MEMS accelerometers are capable of high acceleration sensitivity while maintaining good linearity, low Brownian (mechanical) noise, good temperature consistency and miniaturized volume.

However, typical MEMS accelerometers have a fundamental trade-off between the resolution and power consumption, limiting their use to applications that require both high resolution and a high-power budget, or applications where resolution can be sacrificed to accommodate a low power budget. The reason behind this is the trade-off between readout circuit noise and power. High-resolution accelerometers require an ultra-low noise floor for their readout circuit so that the signal-to-noise ratio does not limit the overall resolution. As a result, low-noise amplifiers and signal chopping techniques are typically adopted to reduce thermal noise and flicker noise, respectively, creating a trade-off between the benefit they provide and the circuit power required for their operation.

This section provides background information related to the present disclosure which is not necessarily prior art.

SUMMARY

This section provides a general summary of the disclosure, and is not a comprehensive disclosure of its full scope or all of its features.

A motion sensing system is presented. The motion sensing system includes: a motion sensor having a proof mass and cantilever beams, producing acceleration signals with its capacitance change, a bias circuit interfaced with the motion sensor and operable to supply a bias voltage to the motion sensor, where the magnitude of the bias voltage is such that the motion sensor signal is larger than flicker noise associated with the readout circuit, and a readout circuit having a low-power input amplifier coupled to output terminals of the motion sensor without signal chopping. The bias circuit includes at least one Dickson charge pump. The bias voltage supplied by the bias circuit includes a positive bias voltage and a negative bias voltage, such that magnitude of the positive bias voltage differs from the magnitude of the negative bias voltage. The bias circuit is further configured to supply a positive bias voltage and a negative bias voltage to the motion sensor, wherein the difference between the magnitude of the positive bias voltage and the magnitude of the negative bias voltage is set to compensate for the process mismatch in the motion sensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
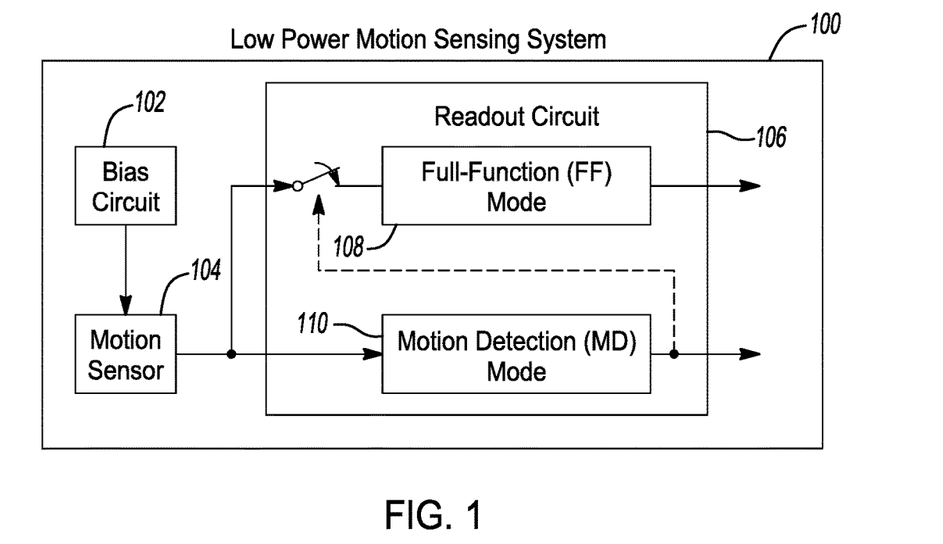
FIG. 1 is a diagram of a proposed architecture for a low power motion sensing system.

FIG. 1 depicts a proposed architecture for a low power motion sensing system 100. The motion sensing system 100 is comprised of a motion sensor 104, a bias circuit 102, and a readout circuit 106. The bias circuit 102 is interfaced with the motion sensor 104 and operates to supply a bias voltage to the motion sensor 104. More specifically, the bias circuit 102 is configured to supply a positive bias voltage and a negative bias voltage to the motion sensor 104.

The motion sensing system 100 has two operating modes. In Full Function mode 108, the readout circuit generates a rail-to-rail analog voltage output that covers a ±1.5 g measurement range for accelerations. Alternatively, in the absence of acceleration, the motion sensing system 100 may switch to an ultra-low power Motion Detection mode 110. In Motion Detection mode 110, power usage is significantly reduced and the measurement range is ±3 g. Operating modes are discussed in greater detail below.

Of note, the magnitude of the bias voltage is such that output signal of the motion sensor 104 is larger than the flicker noise associated with the readout circuit 106 as further described below. The magnitudes of the positive bias voltage and the negative bias voltage can preferably be set to compensate for process mismatch in the motion sensor 104.

In the example embodiment, the bias circuit 102 is further defined as a high-voltage bias circuit although other types of bias circuits are contemplated by this disclosure.

In the example embodiment, the readout circuit 106 is further defined as a complementary metal-oxide-semiconductor (CMOS) analog front end (AFE) circuit although other types of readout circuits are contemplated by this disclosure. While reference is made to an AFE circuit, this disclosure also encompasses other types of readout circuits for motion sensors.

In the example embodiment, the motion sensor 104 is further defined as a triaxial MEMS capacitive accelerometer although other types of accelerometers are contemplated by this disclosure. While reference is made to an accelerometer, this disclosure also encompasses other types of motion sensors having a proof mass and cantilever beams, producing acceleration signals with its capacitance change.

During operation, the motion sensing system 100 utilizes a non-chopping open loop sensing scheme to eliminate the switching loss while keeping the low noise floor (dominated by the flicker noise in low frequency domain) with delicate amplifier structure design and sizing. With no chopping at the accelerometer's bias nodes (which are purely capacitive), high-voltages are generated by the bias circuit 102 and applied as bias voltages to increase the accelerometer sensitivity with little power overhead. The bias circuit 102 compresses its output ripple by splitting its sampling and output electrodes, and it produces programmable positive/negative voltages to compensate for the process mismatch in MEMS devices and avoid mechanical interferences (e.g., electrostatic pull-in).

Figure 2A:
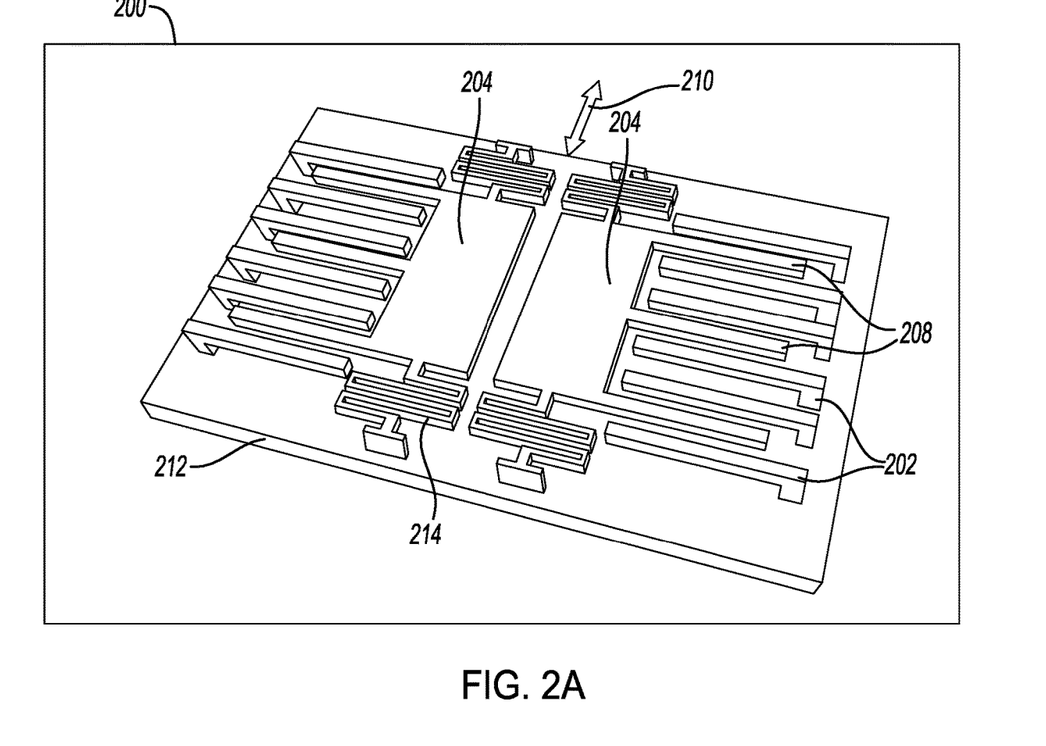
FIG. 2A is a simplified diagram of a fully differential MEMS capacitive accelerometer.
Figure 2B:
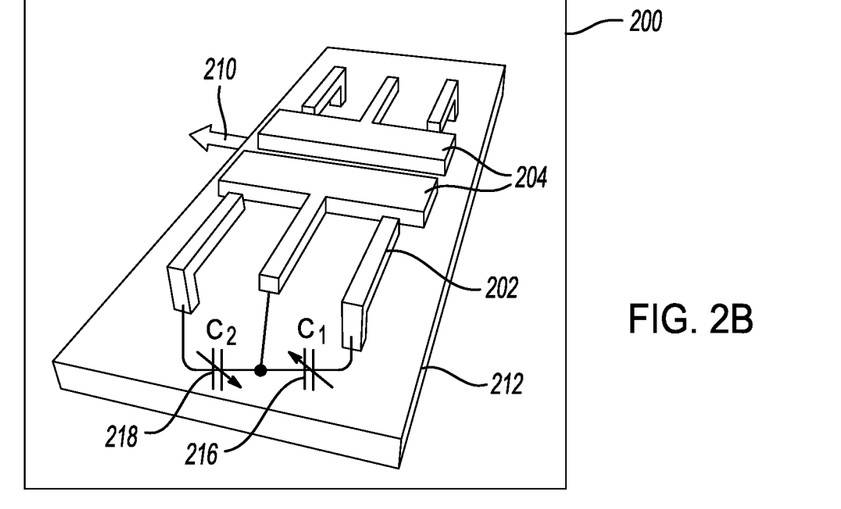
FIG. 2B is zoomed-in diagram showing the coupling capacitance between the MEMS proof-masses and electrodes.

FIGS. 2A and 2B depict the simplified diagram of a fully differential MEMS capacitive accelerometer 200 of the example embodiment. The MEMS capacitive accelerometer 200 is a micro-mechanical structure comprising fixed electrodes 202 and movable proof-masses 204. Both the electrode 202 and the proof-masses 204 have multiple "fingers" or beams 202, 208 that cross-couple together, forming a coupling capacitance between the fingers 202, 208. When an acceleration 210 occurs, the proof-mass fingers 208 deflect from their initial position while the electrode fingers 202 stay stationary (relative to the substrate 212), changing the gap distance between the proof-mass fingers 208 and the electrode fingers 202 causing a capacitance change that can be detected to reflect the acceleration 210.

FIG. 2A shows the simplified diagram of the fully differential MEMS capacitive accelerometer 200 that comprises two proof-masses 204 and two electrodes 202 in the example embodiment. The proof-masses 204 are anchored to the substrate 212 via suspension beams 214, and their displacement, x, under the acceleration 210, a, can be expressed as $$\frac{dx}{da} = \frac{m}{k_m} = \frac{1}{\omega^2} \tag{1}$$

where m represents the proof mass, $k_m$ is the spring constant of the suspension beam 214, and $\omega$ is the fundamental frequency of this mechanical system, which determines the bandwidth of the accelerometer 200. The proof-mass 204 displacement causes the capacitance change of $C_1$ 216 and $C_2$ 218 between itself and two neighboring electrodes 202, as shown in FIG. 2B. The values of $C_1$ 216 and $C_2$ 218 are expressed as follows:

$$C_1 = \frac{\varepsilon A}{g0 - x} \tag{2}$$

$$C_2 = \frac{\varepsilon A}{g0 + x}$$

where $\varepsilon$ is the permittivity, A is the area of parallel plates, and $g_0$ is the initial gap distance between the centered proof mass 204 and the electrodes 202. Taking $C_1$ 216 as an example, the capacitance sensitivity of $C_1$ 216 to displacement can be derived as $$\frac{dC_1}{dx} = \frac{\varepsilon A}{(g_0 - x)^2} \tag{3}$$

Combining (1) and (3), the MEMS capacitance sensitivity to the acceleration 210 is $$\frac{dC_1}{da} = \frac{dC_1}{dx}\frac{dx}{da} = \frac{m\varepsilon A}{k_m(g_0 - x)^2} \tag{4}$$

To maintain good linearity in sensing accelerations, the MEMS is usually designed with a large mechanical stiffness $k_m$ to make proof-mass displacement $x \ll g_0$, and both $C_1$ 216 and $C_2$ 218 will have constant sensitivities within the accelerometer measurement range:

$$\frac{dC_1}{da} = \frac{dC_2}{da} = \frac{m\varepsilon A}{k_m g_0^2} \tag{5}$$

The fully differential MEMS capacitive accelerometer 200 shown in FIG. 2B produces two pairs of $C_1$ 216 and $C_2$ 218 with the opposite sensitivity for accelerations. $C_1$ 216 and $C_2$ 218 are configured as a capacitive Wheatstone bridge that has twice the sensitivity compared with a single-ended accelerometer and possesses superior common-mode rejection to noise, offset, etc.

Figure 3:
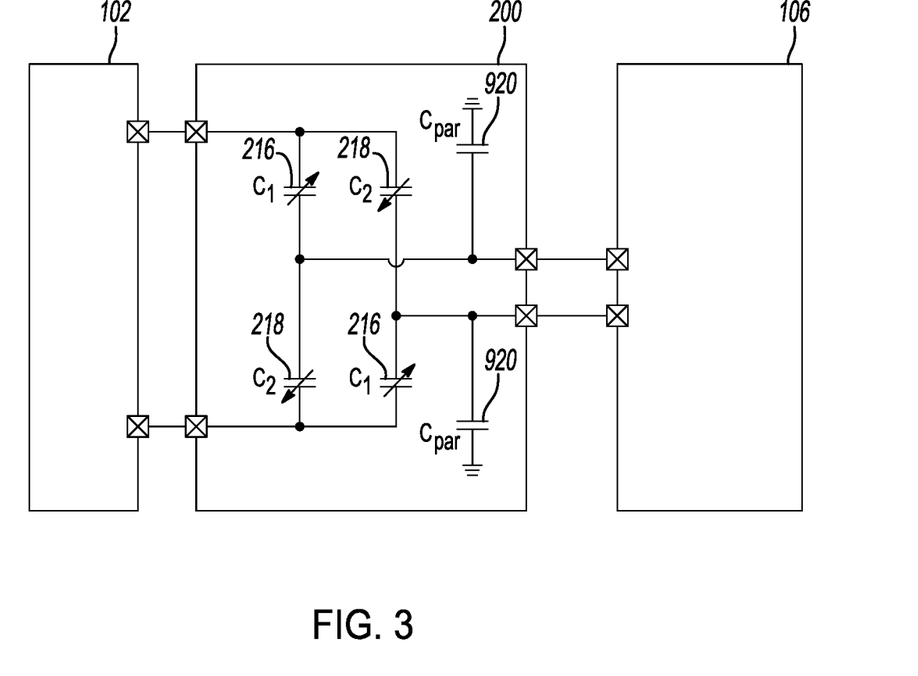
FIG. 3 is a diagram of the proposed high-voltage biasing scheme.

FIG. 3 depicts the high-voltage biasing scheme for the MEMS capacitive accelerometer 200 of the example embodiment. To convert the capacitance change in the accelerometer 200 to a more convenient readout, the accelerometer 200 is biased with a voltage $V_B$ so it can produce electrical signals that reflect the incoming accelerations. In conventional MEMS capacitive accelerometers, there is a large trade-off between the accelerometer resolution and power consumption, which is consistent with the fundamental trade-off between the AFE noise and power. In power-constrained applications such as Internet-of-Things (IoT) devices, it remains challenging for MEMS capacitive accelerometers to achieve a sub-mg sensitivity with µW-level power consumption.

To overcome this power-noise dilemma, the accelerometer 200 signal is increased to reduce the noise and equivalently improve the signal-to-noise ratio (SNR). By applying a significantly higher bias voltage (e.g., 10× compared to conventional MEMS capacitive accelerometers), the accelerometer 200 signal is raised much higher than the noise floor of the AFE circuit 106. This eliminates the need for power-hungry linear noise amplifiers (LNA) and signal chopping to suppress thermal noise and flicker noise, respectively, and one can design the AFE circuit 106 with a nA-level supply current while still maintaining a good SNR.

Compared to conventional MEMS capacitive accelerometers, the high-voltage biased MEMS accelerometer 200 is not subject to a trade-off between AFE 106 power and AFE 106 noise. Instead, power-resolution performance of the accelerometer 200 is determined by what voltage levels can be applied to the accelerometer 200 for a given power budget.

Figure 4A:
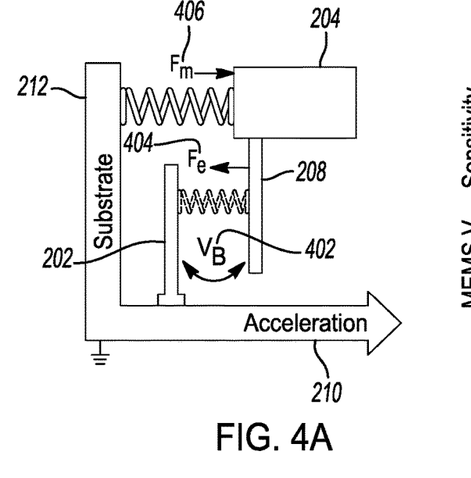
FIG. 4A is a stress analysis of the proof-mass considering both mechanical force, $F_m$, and electrostatic force, $F_e$.

FIG. 4A depicts a stress analysis of the proof mass 204 when considering both mechanical force $F_m$ and electrostatic force $F_e$ of the example embodiment.

The benefit of high-voltage bias is not obvious when considering the impact of bias voltage on the accelerometer's 200 mechanical movement. The large voltage stress across the proof mass 204 and electrodes 202 generates electrostatic force between them and results in an additional movement of the proof mass 204. To quantitatively analyze the impact of the electrostatic force, $C_1$ 216 is taken as an example to calculate the force between a proof mass 204 and electrode 202, as shown in FIG. 4A. When a bias voltage $V_B$ 402 is applied across the proof mass 204 and electrode 202, the total energy stored in $C_1$ 216 is expressed by $$E = C_1 V_B^2 \quad (6)$$

The electrostatic force $F_e$ 404 between the proof mass 204 and electrode 202 can be derived by $$F_e = \frac{dU}{dx} = \frac{dC_1}{dx} V_B^2 = \frac{\varepsilon A V_B^2}{(g_0 - x)^2} \quad (7)$$

Note that $F_e$ 404 increases nonlinearly with the proof-mass displacement, and it is always a destabilizing (positive feedback) force that fights against the mechanical recovery force $F_m$ 406 by the accelerometer suspension beam 214. In a stable accelerometer 200, $F_e$ 404 always needs to stay lower than $F_m$ 406 or the electrostatic force will keep moving the proof mass towards the electrode and eventually result in an electrostatic pull-in. Taking the expression of $F_m$ 406 and $F_e$ 404, the equation becomes $$k_m(g_0 - x) > \frac{\varepsilon A V_B^2}{(g_0 - x)^2} \quad \text{or} \quad (8)$$

$$V_B < \sqrt{\frac{k_m(g_0 - x)^3}{\varepsilon A}} \quad (9)$$

Equations (8) and (9) reveal an important trade-off between the accelerometer bias voltage 402 and the proof-mass displacement range. With a larger $V_B$ 402 applied to the accelerometer 200, its proof-mass displacement needs to be more constrained to maintain $F_m > F_e$ and avoid pull-in. When $V_B$ 402 exceeds $$\sqrt{\frac{k_m g_0^3}{\varepsilon A}},$$

the proof mass 204 will destabilize and pull-in even without any displacement (acceleration) applied, so it implies a theoretically maximum $V_B$ 402 that can be used to bias the accelerometer 200.

Another way to understand the impact of $V_B$ 402 is through the change in the capacitance sensitivity of the accelerometer that was derived in Equation (4). Intuitively, if the proof mass 204 initially moves a distance $x_1$ with input acceleration, it moves closer to the electrode and experiences a greater attraction force from the electrode. The attraction force will move the proof mass 204 an additional distance $x_2$ so that its overall displacement becomes $x_1 + x_2$ under the same acceleration. The proof mass 204 behaves as if it has a 'reduced stiffness' from the suspension beam 214, so Equation (4) is rewritten as $$\frac{dC_1}{da} = \frac{m\varepsilon A}{(k_m + k_e)(g_0 - x)^2} \quad (10)$$

where $k_m$ and $k_e$ represent the mechanical stiffness (by suspension beams 214) and electrostatic stiffness (by high-voltage bias $V_B$ 402), respectively, and their values are expressed by $$k_m = \frac{ma}{x} \quad k_e = -\frac{2\varepsilon A V_B^2}{(g_0 - x)^3} \quad (11)$$

Figure 4B:
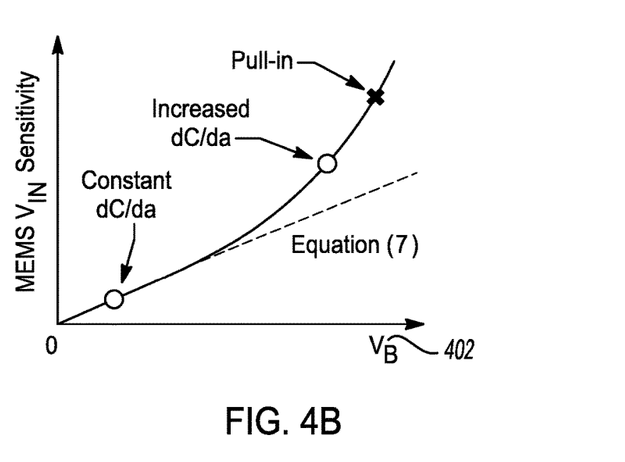
FIG. 4B is a chart showing the change of the MEMS/accelerometer sensitivity as the bias voltage, $V_B$, increases under a fixed acceleration.

With a larger $V_B$ 402, the accelerometer's 200 overall stiffness ($k_m + k_e$) decreases, resulting in a higher capacitance sensitivity to acceleration 210. This further transfers into a non-linear increase in the accelerometer 200 signal $V_{IN}$ at given accelerations 210 as shown in FIG. 4B. When $V_B$ 402 is small, the electrostatic feedback is negligible, and $V_{IN}$ increases linearly with $V_B$ 402. When $V_B$ becomes large and generates enough strong electrostatic force to the proof mass 204, a super-linear increase in $V_{IN}$ will occur.

Figure 5A:
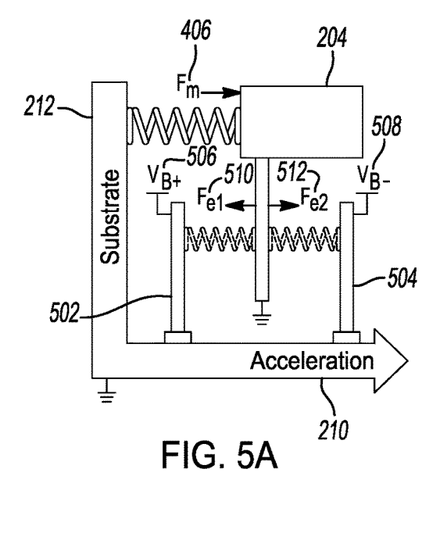
FIG. 5A is a stress analysis of the proof-mass in a differential MEMS structure.

FIG. 5A depicts a stress analysis of the proof-mass 204 in a differential MEMS structure.

To take advantage of the high-voltage bias while mitigating its side effect due to electrostatic feedback, the MEMS's differential structure is utilized and a balanced positive and negative voltage is applied on the two electrodes neighboring a proof mass. As shown in FIG. 5A, a first electrode 502 is biased with a positive high-voltage, $V_{B+}$ 506, while a second electrode 504 is biased with a negative voltage, $V_{B-}$ 508, of the same magnitude. When the proof-mass 204 is DC coupled to ground/substrate 21, it will experience equal electrostatic forces $F_{e1}$ and $F_{e2}$ from the first electrode 502 and the second electrode 504, respectively, but in opposite directions, so forces $F_{e1}$ 510 and $F_{e2}$ 512 cancel each other out. Then the proof-mass 204 will no longer suffer from electrostatic feedback regardless of the value of $V_{B+}$ 506 and $V_{B-}$ 508.

However, maintaining a balanced electrostatic force on both proof-masses 204 is tricky in practical applications, and electrostatic feedback still exists due to electrostatic mismatch, defined as $F_{mis}=F_{e1}+F_{e2}$. There are two reasons for a non-zero electrostatic mismatch:

1) During MEMS fabrication, process variation can cause a mismatch in the MEMS's mechanical parameters (e.g., area A or gap distance $g_0$ in Equation (7)). Circuit non-idealities also induce electrical mismatch, such as voltage errors and ripples, making it difficult to generate exactly equalized $V_{B+}$ and $V_{B-}$.

2) The values of $F_{e1}$ and $F_{e2}$ diverge with input acceleration regardless of their equilibrium condition in the stationary state. When acceleration occurs, $F_{mis}$ can be written as $$F_{mis} = F_{e1} + F_{e2} = \frac{\varepsilon A V_{B+}^2}{(g_0-x)^2} - \frac{\varepsilon A V_{B-}^2}{(g_0+x)^2} \quad (12)$$

which is simplified as $$F_{mis} = \varepsilon A V_B^2 \frac{4g_0 x}{(g_0^2+x^2)^2} \quad (13)$$

When $x^2 \ll g_0^2$, $F_{mis}$ increases proportionally with the proof-mass displacement. But if x grows large enough under strong accelerations, the increase of $F_{mis}$ becomes dramatic and eventually converges into the single-ended electrostatic force described in Equation (7).

For both of the reasons listed above, the electrostatic mismatch is exacerbated quadratically with the $V_B$ increase, and thus both issues need to be carefully considered in the high-voltage bias scheme for MEMS capacitive accelerometers. Electrostatic mismatch can be overcome using Electrostatic Mismatch Compensation (EMC), which strategically manipulates the bias voltages to improve upon the challenges raised by $F_{mis}$. The EMC technique has two goals:

1) to extend the linear region of MEMS sensitivity, and thus accelerometer sensitivity, to higher $V_B$ levels. As discussed above, the electrostatic mismatch due to MEMS process variation and circuit nonideality becomes more obvious with a larger $V_B$. To compensate for the mismatch, EMC directly equalizes $F_{e1}$ and $F_{e2}$ by inducing an intended voltage skew $\Delta V_B$ between $V_{B+}$ and $V_{B-}$ and maintaining ultra-low voltage errors and ripples for $\Delta V_B$. As a result, the sensitivity of the MEMS, and thus the accelerometer, stays linear until a higher $V_B$ threshold, as shown by curve 516 in FIG. 5B and as compared to curve 514 in FIG. 5B, and it guarantees a wider region of clean bias without electrostatic feedback on the MEMS/accelerometer.

Figure 5B:
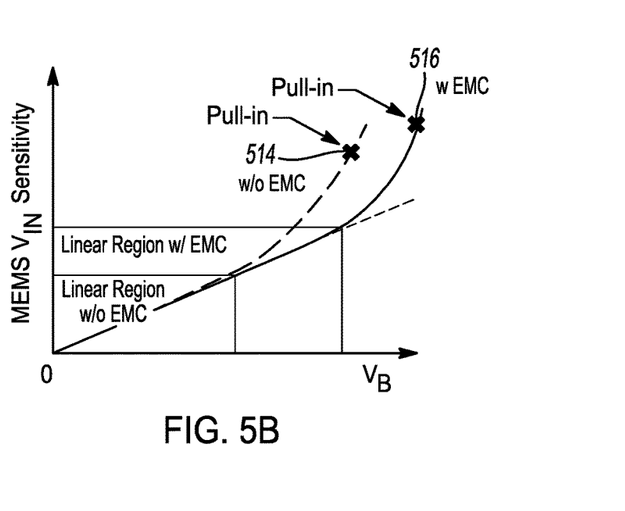
FIG. 5B is a chart showing the change in MEMS/accelerometer sensitivity with bias voltages, $V_B$, for systems with and without electrostatic mismatch compensation (EMC).

2) to optimize the trade-off between MEMS sensitivity, and thus accelerometer sensitivity, and full scale. At very large $V_B$, non-linearity appears in the MEMS/accelerometer sensitivity, and electrostatic mismatch is primarily caused by the proof-mass displacement as a result of input acceleration. It is beneficial to achieve higher MEMS sensitivity at the cost of losing its dynamic range, but the process must be properly controlled to guarantee the MEMS/accelerometer linearity to accelerations and avoid electrostatic pull-in. EMC achieves this by carefully choosing the values of $V_{B+}$ and $V_{B-}$ so that sufficient dynamic range is achieved, and the pull-in point is pushed into a higher bias voltage. EMC also determines the safe margin on the bias voltages when considering the variation across MEMS chips/wafers.

EMC guarantees a more stable, predictable, and variation-robust MEMS/accelerometer operation when using a high-voltage bias, resulting in a better accelerometer SNR. EMC is implemented on the high-voltage bias circuit described below.

Figure 6:
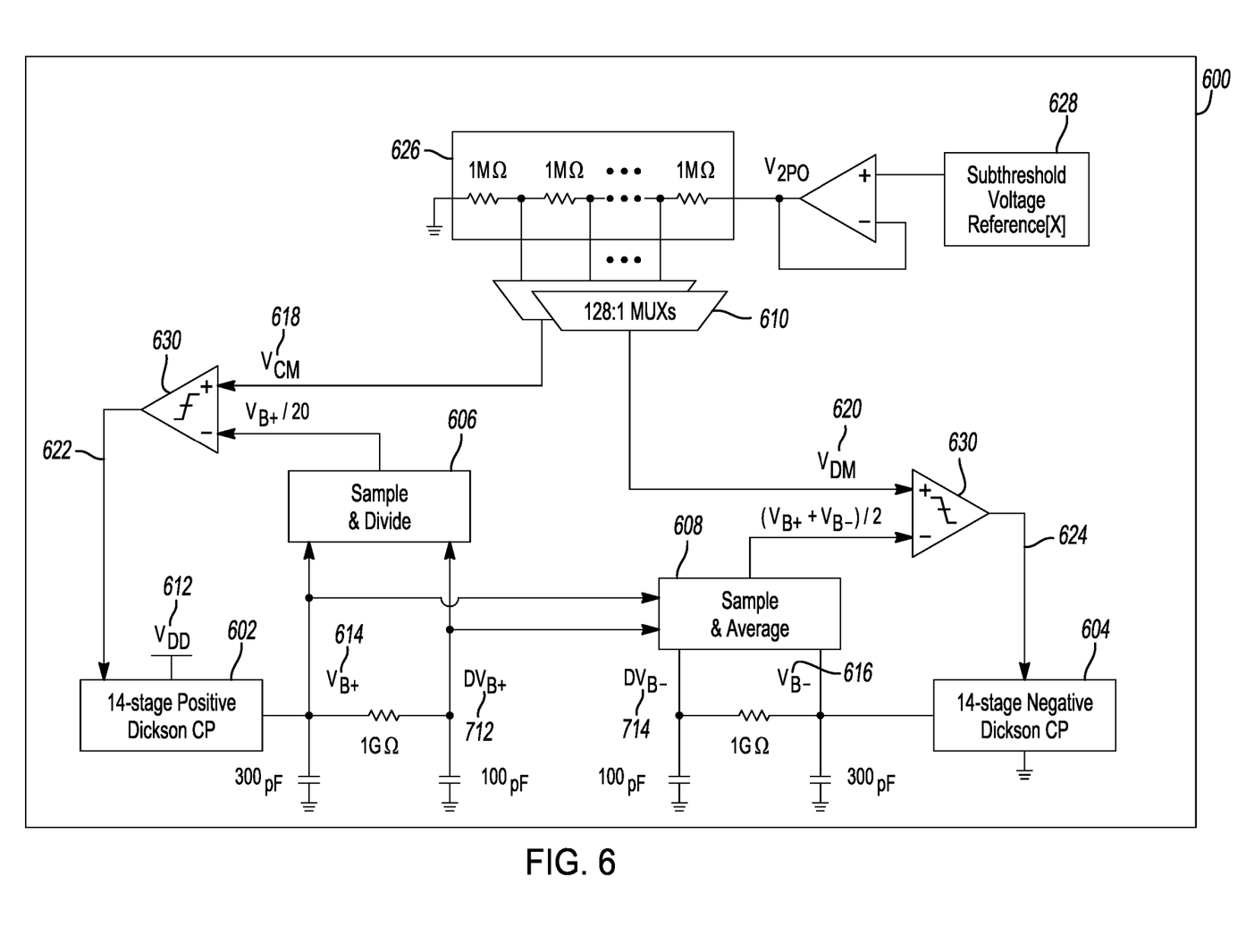
FIG. 6 is a circuit diagram showing an example embodiment of a high-voltage bias circuit.

FIG. 6 depicts the top-level diagram of the high-voltage bias circuit 600 of the example embodiment. The EMC technique relies on generating precisely controlled $V_{B+}$ 614 and $V_{B-}$ 616 with proper values to compensate for various process variations (e.g. MEMS process variations) and various circuit non-idealities (e.g. CMOS circuit non-ideality). In the example embodiment, the high-voltage biases are up-converted from $V_{DD}$ 612 using Dickson charge pumps 602, 604 for the large conversion ratio, chip integration, and high efficiency with low load current. In the example embodiment, $V_{B+}$ 614 and $V_{B-}$ 616 are DC voltages.

FIG. 6 shows the positive charge pump 602 and negative charge pump 604 on the high-voltage bias circuit 600 used to generate $V_{B+}$ 614 and $V_{B-}$ 616, respectively. The charge pump outputs 614, 616 are sampled and compared with the respective positive reference voltage, $V_{CM}$ 618, and negative reference voltage, $V_{DM}$ 620, and the comparison results 622, 624 modulate the charge pumps' operations in a delta-sigma manner to form a closed-loop control on the bias voltages 614, 616. In the example embodiment, $V_{B+}$ 614 and $V_{B-}$ 616 are in the range of 20-30 V while $V_{CM}$ 618 and $V_{DM}$ 620 are in the range of 0-2 V, so the bias voltages 614, 616 must be divided before they can be compared with the reference voltages 618, 620. However, any voltage errors from the reference are amplified by the large division ratio (e.g., 20:1) when the voltage errors appear in the bias voltages. In the example embodiment, the programmable reference voltages 618, 620 are multiplexed 610 from a resistive voltage divider 626 that divides 2V with 128 poly-resistors, and the quantization error is 2 V/128≈15 mV. The resulting error on $V_{B+}$ 614 and $V_{B-}$ 616 will then become 15 mV×20=300 mV, making it difficult to achieve EMC with the required voltage precision.

To avoid this quantization error, voltage sampling and division (20×) 606 is only performed for $V_{B+}$ 614 to control the positive charge pump 602. For $V_{B-}$ 616, the arithmetic mean of $V_{B-}$ 616 is sampled with $V_{B+}$ 614 at 608 and the mean value is directly compared with the negative reference voltage $V_{DM}$ 620 to determine the negative charge pump 604 operation. As a result, $V_{B-}$ 616 will follow the change of $V_{B+}$ 614 while keeping a programmable voltage skew $\Delta V_B = (V_{B+}+V_{B-})$ that is determined by the second comparison. Expressed as an equation, the bias voltages are refactored into a "common-mode" part and a "differential-mode" part:

$$V_{B+}=20V_{CM} \quad (14)$$

$$V_{B-}=-20V_{CM}+2V_{DM} \quad (15)$$

where $V_{CM}$ 618 and $V_{DM}$ 620 are the reference voltages that are used by the comparison for the positive and negative charge pumps 602, 604, respectively. While the voltage error of $V_{CM}$ 618 is multiplied by 20 on both $V_{B+}$ 614 and $V_{B-}$ 616, the $V_{DM}$ 620 error only has a 2× effect on $(V_{B+}+V_{B-})$. As $x \ll g_0$ remains true within the measurement range of the accelerometer of the example embodiment, Equation (12) can be rewritten with the condition $x \ll g_0$:

$$F_{mis} = \frac{\varepsilon A(V_{B+}+V_{B-})(V_{B+}-V_{B-})}{g_0^2} \quad (16)$$

which shows that $F_{mis}$ is reduced proportionally with $\Delta V_B=(V_{B+}+V_{B-})$.

Besides the quantitation errors, that are improved with the above technique, $V_{B+}$ 614 and $V_{B-}$ 616 may also suffer from noise and fluctuation from the supply voltage $V_{DD}$ 612 if $V_{CM}$ 618 and $V_{DM}$ 620 are directly generated from $V_{DD}$ 612. To overcome this, the supply voltage $V_{DD}$ 612 is divided with a subthreshold voltage reference 628 that has a −41 dB power supply rejection and a <1% error from 0° C. to 100° C. Because the subthreshold voltage reference 628 has a large current variation across temperatures, its output voltage is buffered before applying it to the voltage divider 626 to guarantee a sufficient current that flows through the poly-resistors and generates precise $V_{CM}$ 618 and $V_{DM}$ 620.

Figure 7A:
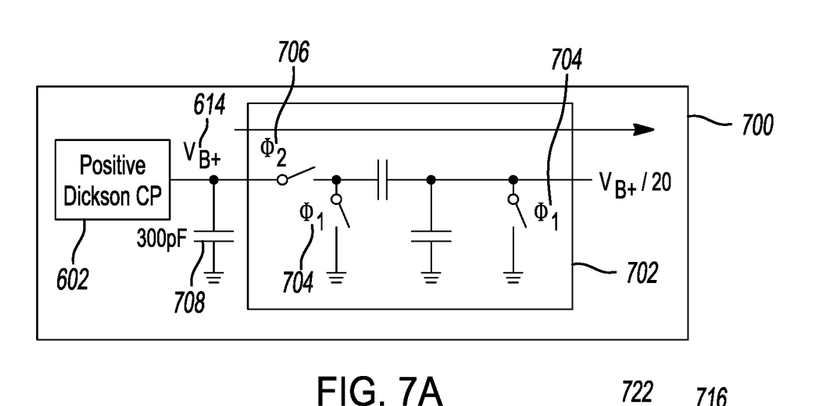
FIG. 7A shows the structure of a voltage divider with serial switched capacitors.

FIG. 7A depicts a serial-connected switched-capacitor voltage converter of the example embodiment. Several circuit challenges are raised with sampling/dividing the high-voltage $V_{B+}$ 614 and $V_{B-}$ 616. First, the switched-capacitor voltage divider 702 induces a switching loss approximately equal to $0.5\,f\,CV^2$, where f is the sampling frequency, C is the sampling capacitance and V is the voltage swing. For the sufficiently fast charge pump feedback control required by EMC (e.g., f=1000 Hz, C=100 fF and V=30 V), the resulting power losses on $V_{B+}$ 614 and $V_{B-}$ 620 are in the 100 nW range, and it takes even more power consumption from $V_{DD}$ 612 to replenish the bias voltage losses. To mitigate the power overhead that results from frequently sampling/dividing the high-voltage nodes, a serial-connected switched-capacitor voltage converter 700 is implemented. By implementing the serial switched-capacitor divider, its AC signal division is only related to $\Phi_2$ 706, so $\Phi_2$ 706 can be highly duty-cycled to keep it on and update $V_{B+}/20$ with any ripples and variations that occur at $V_{B+}$ 614. Meanwhile, $\Phi_1$ 704 is only turned on once after a long period of time (e.g., seconds) so the sampling frequency will be in the sub-Hz range, significantly reducing power consumption.

Figure 7B:
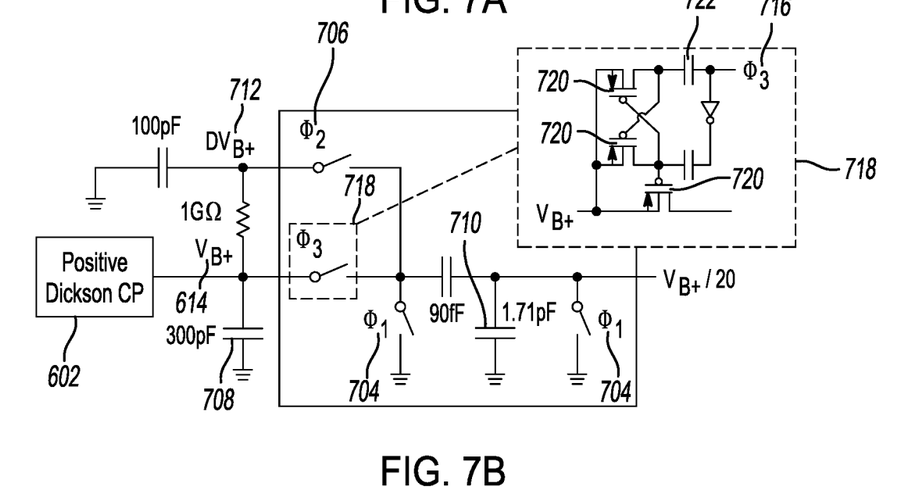
FIG. 7B is a diagram of a $V_{B+}$ sampling and division circuit with a separated dirty $V_{B+}$ to pre-charge the sampling nodes and reduce $V_{B+}$ ripples.
Figure 7C:
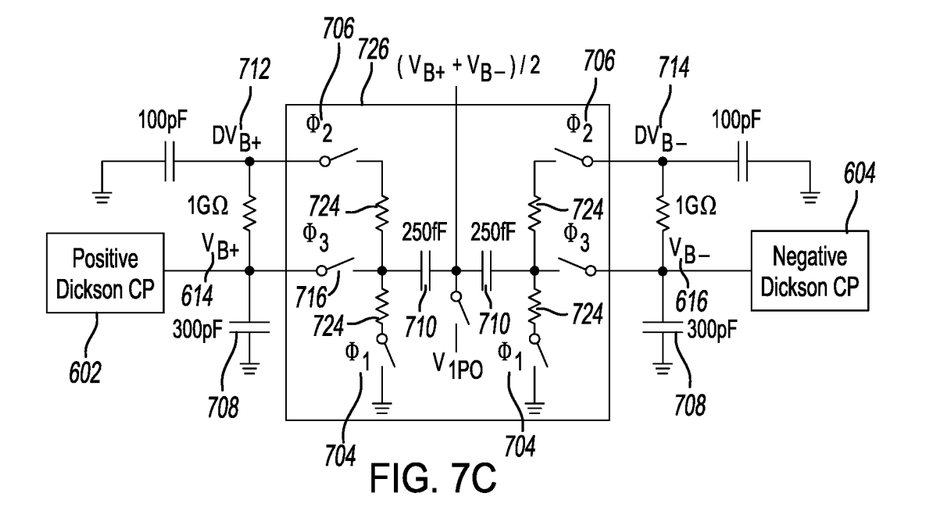
FIG. 7C is a diagram of the $V_{B+}$ and $V_{B-}$ average circuit

FIGS. 7B and 7C depict the high-voltage sampling circuit of the example embodiment and division/average circuits of the example embodiment, respectively. A second challenge manifests itself when the storage capacitor 708 charge shares with the sampling capacitor 710, resulting in ripples on $V_{B+}$ 614 and $V_{B-}$ 616. Although a large capacitor ratio is guaranteed, the ripples can be in the 100 mV range due to the high-voltage scales of $V_{B+}$ 614 and $V_{B-}$ 616, causing an unpredictable, transient $F_{mis}$ to the accelerometer 200 and increasing the common-mode noise seen by the readout circuit 106. To address this issue, $V_{B+}$ 614 and $V_{B-}$ 616 are separated from two 'dirty' nodes, $DV_{B+}$ 712 and $DV_{B-}$ 714 (see FIG. 7C), each through a large RC constant ($\tau$=1 G$\Omega$ 100 pF=0.1 s). During voltage sampling, $DV_{B+}$ 712 and $DV_{B-}$ 714 first pre-charge the sampling capacitors 710 to near $V_{B+}$ 614 and $V_{B-}$ 616 so that the ripples occur on the dirty nodes instead of the actual accelerometer 200 bias voltages. The dirty nodes' voltage loss will later be replenished by the charge pump 602, but through the large RC network. As a result, $V_{B+}$ 614 and $V_{B-}$ 616 only see charge pump ripples rather than the much larger sampling ripples.

Figure 7D:
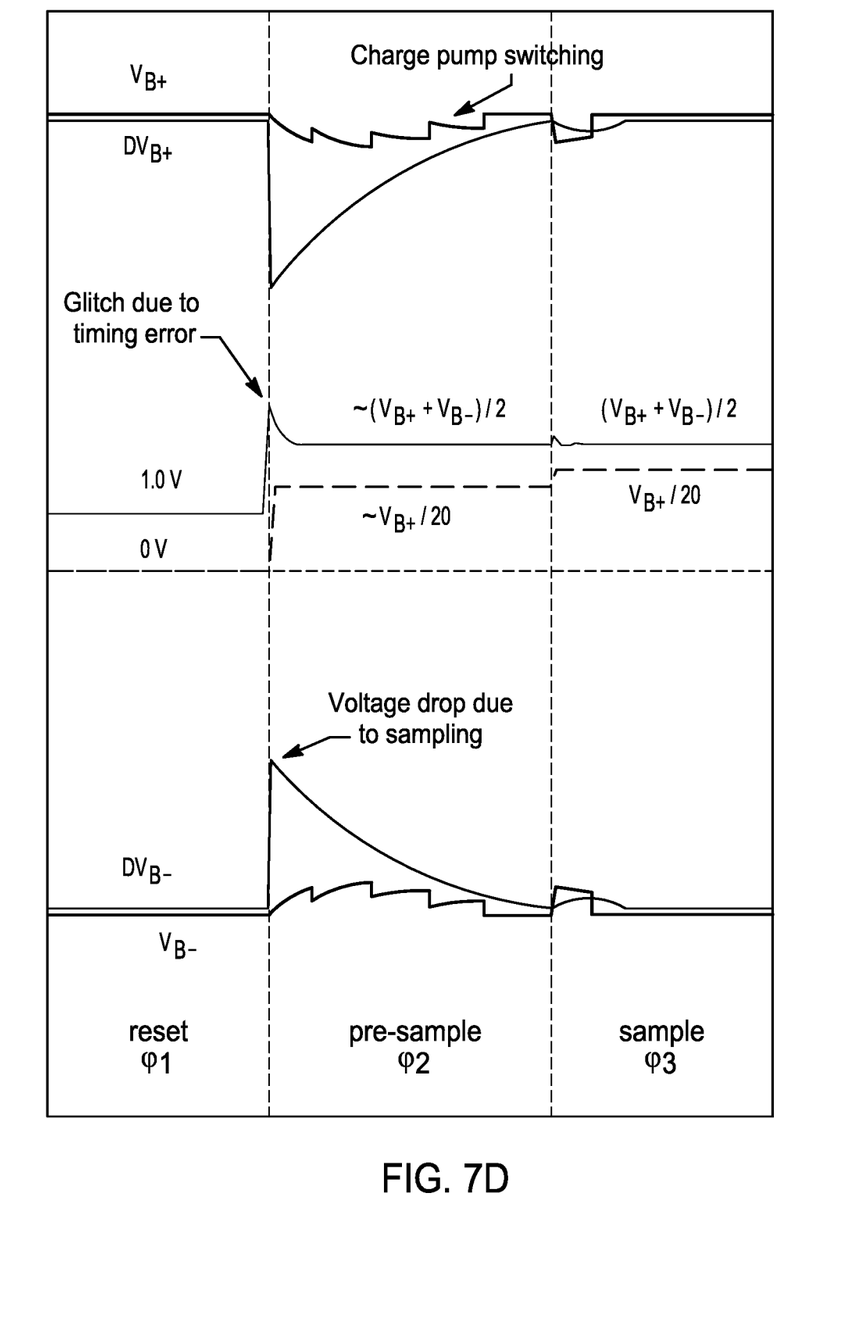
FIG. 7D is a conceptual waveform showing the transient voltages of 7B and 7C.

FIG. 7D describes the transient waveform during voltage sampling. The pulse width of $\Phi_1$ 704 and $\Phi_2$ 706 remains short compared to the sampling period, and $\Phi_3$ 716 stays high for most of the time to provide an AC throughput as discussed above. Timing switches 718 are implemented with high-voltage transistors 720 with their control signals level-shifted by capacitive level shifters 722, also mitigating control power with low sampling frequency. Furthermore, in the voltage average circuit in FIG. 6, current-limiting resistors 724 are included to reduce voltage spikes on ($V_{B+}$+$V_{B-}$)/2 726 due to the timing difference of the $V_{B+}$ 614 and $V_{B-}$ 616 switches and to prevent the spike from damaging the comparator circuits 630.

Figure 8:
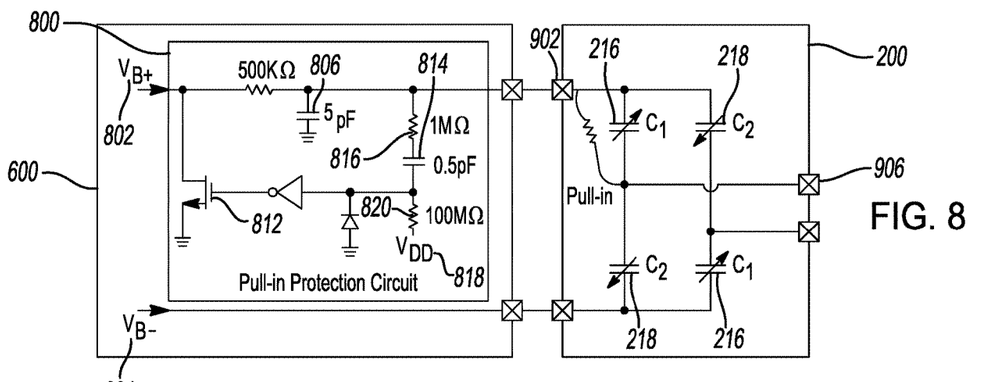
FIG. 8 is a diagram of the pull-in detection and protection circuit.

FIG. 8 depicts a diagram of the pull-in detection and protection circuit 800. When EMC optimizes the trade-off between accelerometer sensitivity and full scale, it applies the highest $V_{B+}$ 802 and $V_{B-}$ 804 with a safe margin for input accelerations and process variation. However, it is still possible during the operation/calibration phase that an improper bias voltage is applied and triggers an electrostatic pull-in for the accelerometer 200. While the pull-in is mechanically recoverable for the accelerometer, it raises issues for the readout circuit 106 because of the electrical contact between the proof mass 204 and electrode 202, including the potential breakdown of the transistor's gate oxide and permanent damage to the readout circuit.

To prevent this from occurring, a pull-in detection and protection circuit 800 is implemented on the high-voltage bias circuit 600. A smaller (5 pF) capacitor 806 is connected to $V_{B+}$ 802 so that when the first proof-mass 906 pulls-in with the first electrode 902, the voltage drop at the first electrode 902 is large enough to be detected. The first electrode 902 voltage drop is AC-coupled to the high-voltage bias circuit with a high-pass filter consisting of 0.5 pF capacitor 814 and a 100 M$\Omega$ resistor 816 to generate a reset signal that grounds $V_{B+}$ 802 via transistor 812. By controlling the bandwidth of this feedback, the pull-in detection and protection circuit 800 can detect and ground $V_{B+}$ 802 before it generates a high-enough voltage spike to damage the readout circuit. After $V_{B+}$ 802 is grounded to 0, the electrostatic force between the first proof mass 906 and the first electrode 902 disappears, and the first proof mass 906 is recentered by the suspension beam 214. Meanwhile, in the pull-in detection and protection circuit 800, $V_{DD}$ 818 will re-charge the 0.5 pF capacitor 814 through the DC path that included the 100 M$\Omega$ resistor 820, and the reset signal is then retracted to enable $V_{B+}$ 802 to rebuild its voltage.

Figure 9:
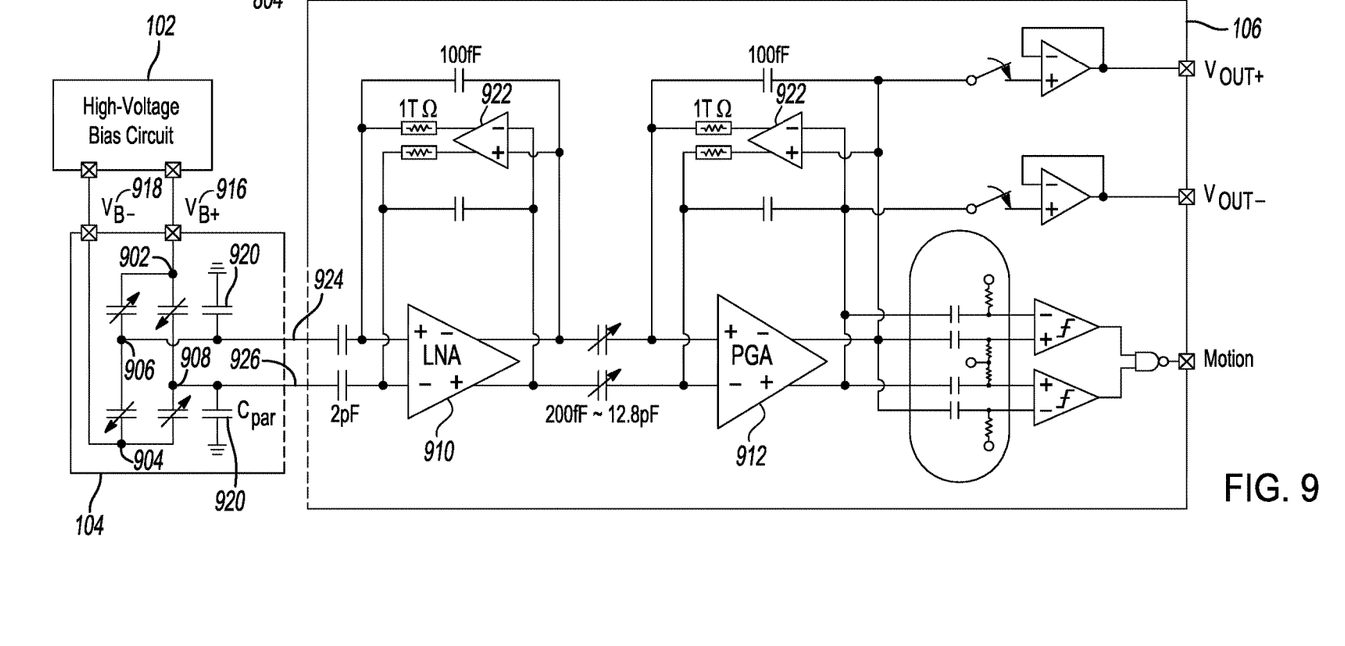
FIG. 9 is a top-level diagram showing the MEMS/accelerometer circuit and the readout circuit.
Figure 10:
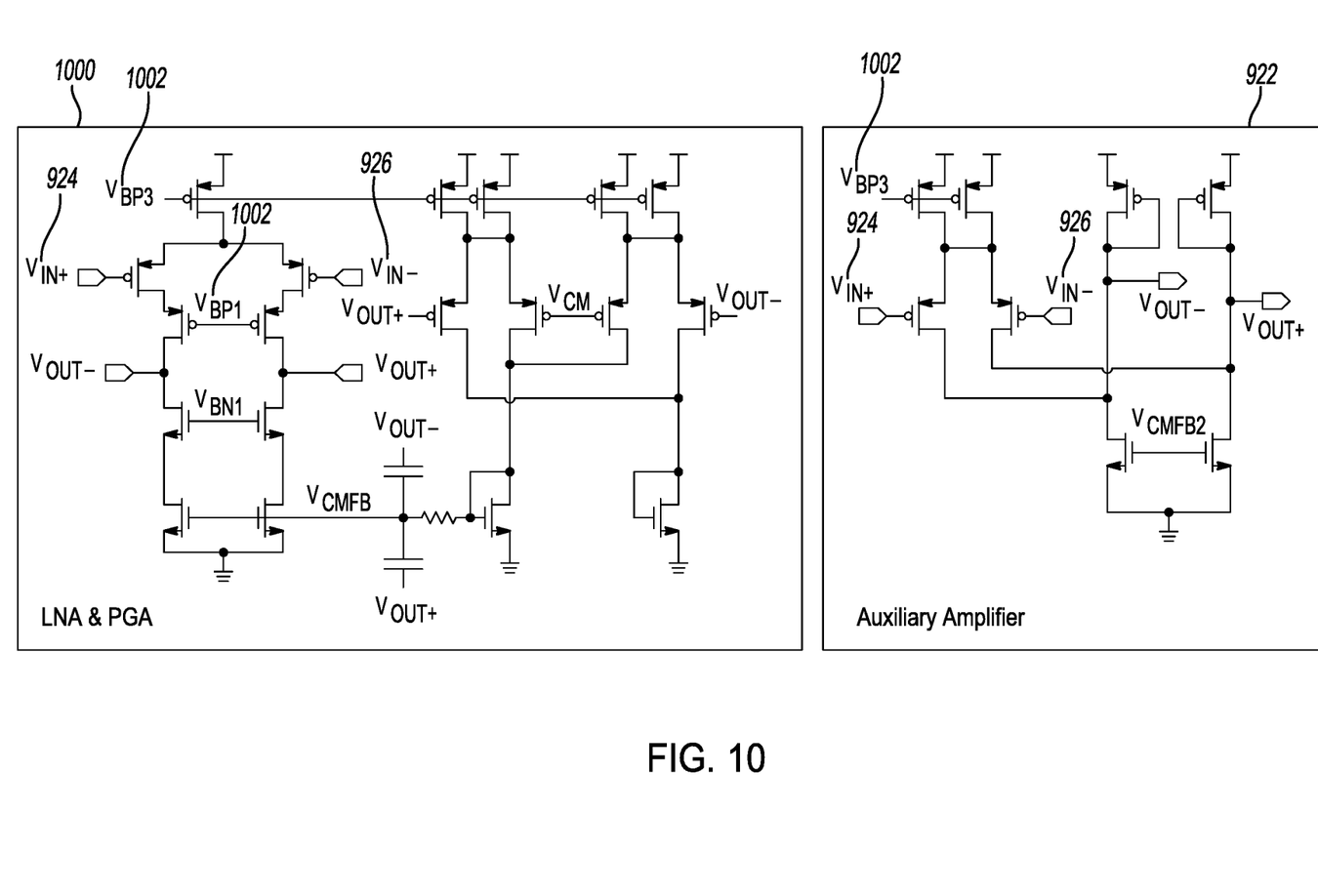
FIG. 10 is a schematic of the combined low noise amplifier and programmable gain amplifier and the auxiliary amplifier shown in FIG. 9.

FIG. 9 depicts a top-level diagram showing the accelerometer circuit and the readout circuit. FIG. 10 depicts a schematic of the combined low noise amplifier and programmable gain amplifier and the auxiliary amplifier shown in FIG. 9. The high-voltage bias circuit generates a proper pair of $V_{B+}$ 916 and $V_{B-}$ 918 with EMC and applies the bias voltages 916, 918 to the first electrode 902 and second electrode 904 of the accelerometer, respectively. When acceleration 210 occurs, differential MEMS signal $V_{IN+}$ 924, $V_{IN-}$ 926 is generated across the first proof-mass 906 and the second proof-mass 908 due to the MEMS capacitance change, and the signal is amplified by the AFE circuit 106. Equation (7) shows that the MEMS signal declines with the proof-mass parasitic capacitance $C_{par}$ 920. To reduce $C_{par}$ 920 due to the MEMS-CMOS interconnect, the MEMS and CMOS AFE circuits are eutectically bonded at the wafer level and then the wafer is diced into 2-layer face-to-face bonded MEMS-CMOS chips.

On the AFE circuit 106, a two-stage capacitive coupled amplifier design is adopted consisting of an LNA 910 followed by a PGA 912, as shown in FIG. 10. The combined LNA 910 and PGA 912 design further contains auxiliary amplifiers 922 to shift their output DC-levels to the input for maximized dynamic range. The detailed schematic of the combined LNA and PGA 1000 and the auxiliary amplifier 922 can be found in FIG. 10. Tunable amplifier bias voltages, $V_{BP\,1-3}$ 1002, are generated on chip to cover the temperature range of −40° C. to 80° C. and possible process variations. Both the LNA 910 and PGA 912 consume nW-level power, but their noise floor is far below the significantly increased MEMS signals, so a high SNR is achieved. In the example embodiment, the size of the LNA 910 input pair is enlarged with a width of 187 μm and a length of 0.42 μm, trading off the available chip area for lower flicker noise.

As discussed above in FIG. 1, the system has two operating modes. In the FF mode, the AFE circuit 106 generates a rail-to-rail analog voltage output that covers a ±1.5 g measurement range for accelerations 210. In the absence of acceleration 210, the system can switch to an ultra-low-power MD mode to only output a 1-bit signal when there is an acceleration 210 exceeding the detection threshold. During the MD mode, $V_{DD}$ 612 is reduced from 2V to 1.2V, and bias current across the amplifiers 910, 912, 922 is further reduced to sub-nA levels to save circuit power.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A low power motion sensing system, comprising:
   a motion sensor having a proof mass and cantilever beams, producing acceleration signals with its capacitance change;
   a bias circuit interfaced with the motion sensor and operable to supply a bias voltage to the motion sensor; and
   a readout circuit having an input amplifier coupled to output terminals of the motion sensor without signal chopping, where the magnitude of the bias voltage is such that an output signal from the motion sensor is larger than flicker noise associated with the readout circuit.

2. The motion sensing system of claim 1 wherein the bias circuit includes at least one Dickson charge pump.

3. The motion sensing system of claim 1 wherein the bias voltage supplied by the bias circuit includes a positive bias voltage and a negative bias voltage, such that magnitude of the positive bias voltage differs from the magnitude of the negative bias voltage.

4. The motion sensing system of claim 3 wherein the bias circuit is configured to supply a positive bias voltage and a negative bias voltage to the motion sensor, wherein the difference between the magnitude of the positive bias voltage and the magnitude of the negative bias voltage is set to compensate for the process mismatch in the motion sensor.

5. The motion sensing system of claim 1 wherein the magnitude of the bias voltage is on the order of 20 volts.

6. The motion sensing system of claim 1 wherein the readout circuit includes a low noise amplifier in series with a programmable gain amplifier.

7. The motion sensing system of claim 1 wherein the motion sensor is further defined as an accelerometer.

8. A method for operating a low power motion sensing system, comprising:
   providing a motion sensor with a proof mass and cantilever beams, producing acceleration signals with its capacitance change;
   directly coupling output terminals of the motion sensor to an input amplifier of a readout circuit without signal chopping; and
   supplying high bias voltages to the motion sensor, where the magnitude of the bias voltage is such that an output signal of the motion sensor is larger than a flicker noise associated with the readout circuit.

9. The method of claim 8 further comprises supplying a positive bias voltage and a negative bias voltage to the motion sensor and setting the difference between magnitude of the positive bias voltage and magnitude of the negative bias voltage to compensate for process mismatch in the motion sensor.

10. The method of claim 9 further comprises generating the positive bias voltage using a first Dickson charge pump and generating the negative bias voltage using a second Dickson charge pump.

11. The method of claim 10 further comprises controlling the first Dickson charge pump by sampling and dividing the positive bias voltage output therefrom and comparing to a common mode voltage; and controlling the second Dickson charge by sampling and averaging the negative bias voltage output therefrom and comparing to a differential mode voltage.

12. The method of claim 8 wherein the readout circuit includes a low noise amplifier in series with a programmable gain amplifier.

13. The method of claim 8 wherein the motion sensor is further defined as an accelerometer.

14. The method of claim 8 wherein the magnitude of the bias voltage is greater than 20 volts.

15. A low power motion sensing system, comprising:
    a motion sensor having a proof mass and cantilever beams, producing acceleration signals with its capacitance change;
    a bias circuit interfaced with the motion sensor and operable to supply a positive bias voltage and a negative bias voltage to the motion sensor, where the difference between the magnitude of the positive bias voltage and the magnitude of the negative bias voltage is set to compensate process mismatch in the motion sensor; and
    a readout circuit interfaced with the motion sensor, wherein the readout circuit includes an input amplifier directly coupled to output terminals of the motion sensor, and a programmable gain amplifier in series with the input amplifier, and magnitude of the positive and negative bias voltages are such that an output signal of the motion sensor is larger than flicker noise associated with the readout circuit.

16. The motion sensing system of claim 15 wherein the bias circuit includes a first Dickson charge pump that generates the positive bias voltage and a second Dickson charge pump that generates the negative bias voltage.

17. The motion sensing system of claim 16 wherein the bias circuit further includes a first control circuit that controls the positive bias voltage output by the first Dickson charge pump by sampling and dividing the positive bias voltage and comparing to a common mode voltage, and a second control circuit that controls the negative bias voltage output by the second Dickson charge pump by sampling and averaging the negative bias voltage and comparing to a differential mode voltage.

18. The motion sensing system of claim 15 where the magnitude of the positive bias voltage and the magnitude of the negative bias voltage are both greater than 20 volts.

19. The motion sensing system of claim 15 wherein the motion sensor is further defined as an accelerometer.

\* \* \* \* \*